United States Patent [19]

Kanamori et al.

[11] Patent Number: 4,880,452
[45] Date of Patent: Nov. 14, 1989

[54] METHOD FOR PRODUCING GLASS PREFORM FOR OPTICAL FIBER CONTAINING FLUORINE IN CLADDING

[75] Inventors: Hiroo Kanamori; Gotaro Tanaka; Michihisa Kyoto; Naoki Yoshioka; Futoshi Mizutani, all of Yokohama, Japan

[73] Assignee: Sumitomo Electric Industries, Ltd., Osaka, Japan

[21] Appl. No.: 289,444

[22] Filed: Dec. 22, 1988

Related U.S. Application Data

[63] Continuation of Ser. No. 47,564, May 11, 1987, abandoned, which is a continuation of Ser. No. 739,668, May 31, 1985, abandoned.

[30] Foreign Application Priority Data

Jun. 4, 1984 [JP] Japan .................. 59-113197

[51] Int. Cl.$^4$ .................. C03B 37/018; C03B 37/027
[52] U.S. Cl. .................. 65/3.12; 65/18.2; 65/30.1; 65/DIG. 16
[58] Field of Search .............. 65/DIG. 16, 3.12, 3.11, 65/18.2, 18.4, 900, 30.1

[56] References Cited

U.S. PATENT DOCUMENTS

| | | | |
|---|---|---|---|
| Re. 30,883 | 3/1982 | Rau et al. | 65/DIG. 16 |
| 4,082,420 | 4/1978 | Shiraishi et al. | 65/3.12 |
| 4,161,505 | 7/1979 | Shiraishi et al. | 65/3.12 |
| 4,221,825 | 9/1980 | Guerder et al. | 65/3.12 |
| 4,257,797 | 3/1981 | Andrejco | 65/3.12 |
| 4,295,869 | 10/1981 | Shiraishi et al. | 65/3.12 |
| 4,298,365 | 11/1981 | Bailey et al. | 65/3.12 |
| 4,358,181 | 11/1982 | Gulati et al. | 65/3.12 |
| 4,579,571 | 4/1986 | Hicks | 65/3.12 |
| 4,586,943 | 5/1986 | Kyoto | 65/3.12 |
| 4,599,098 | 7/1986 | Sarkar | 65/3.12 |

FOREIGN PATENT DOCUMENTS

| | | | |
|---|---|---|---|
| 0139348 | 2/1985 | European Pat. Off. | |
| 0140651 | 5/1985 | European Pat. Off. | |
| 0151438 | 8/1985 | European Pat. Off. | |
| 2247307 | 3/1974 | Fed. Rep. of Germany | |
| 2833051 | 2/1979 | Fed. Rep. of Germany | 65/3.12 |
| 55-15682 | 4/1980 | Japan . | |
| 55-67533 | 5/1980 | Japan . | |
| 55-14437 | 11/1980 | Japan | 65/DIG. 16 |
| 56-50136 | 5/1981 | Japan | 65/DIG. 16 |
| 58-208146 | 12/1983 | Japan | 65/DIG. 16 |
| 59-137332 | 8/1984 | Japan | 65/DIG. 16 |

OTHER PUBLICATIONS

Hosaka, Toshihito et al., "Analysis of OH-Ion Diffusion in Single Mode Optical Fibers," Bulletin of Electrical Communication Society, Japan, vol. J64-C, No. 7, pp. 114-120.
Patent Abstracts of Japan, JP-A-55 67 533 (Nippon Denshin Denwa Kosha) 21-05-1980 (Cat. A,D).

*Primary Examiner*—Kenneth M. Schor
*Attorney, Agent, or Firm*—Cushman, Darby and Cushman

[57] ABSTRACT

A method for producing a glass preform for an optical fiber comprising a core and a cladding containing fluorine is fisclosed. The method comprises forming a porous glass layer of substantially pure quartz on an outer surface of a fused glass rod consisting of a central portion of substantially pure quartz and a peripheral portion of quartz glass containing fluorine, and heating a composite of the fused glass rod and the porous glass layer in an atmosphere containing fluorine to add fluorine to the porous glass layer and to make it transparent, by which contamination of glass with hydroxyl groups can be prevented and light transmission characteristics of an optical fiber fabricated from the glass preform are improved.

2 Claims, 2 Drawing Sheets

METHOD FOR PRODUCING GLASS PREFORM FOR OPTICAL FIBER CONTAINING FLUORINE IN CLADDING

This is a continuation of application Ser. No. 047,564 filed May 11, 1987 which was abandoned upon the filing hereof, which in turn, is a continuation of Ser. No. 739,668 filed May 31, 1985, and now abandoned.

FIELD OF THE INVENTION

The present invention relates to a method for producing a glass preform for an optical fiber containing fluorine in a cladding.

BACKGROUND OF THE INVENTION

A typical single mode optical fiber has a refractive index distribution as shown in FIG. 1. Hitherto, such a refractive index distribution was mainly achieved by the addition of an additive which increases the refractive index of the glass in a core of the optical fiber. An additive, such as an oxide $GeO_2$, $P_2O_5$ and $Al_2O_3$ is usually used. However, such an additive may cause some problems such that (1) attenuation of light transmission of the optical fiber is increased by an increase of Rayleigh scattering, (2) bubbles or crystal clusters are induced by the additive in the glass preform and (3) the glass preform tends to crack due to an increase of the coefficient of thermal expansion of the glass. Therefore, the lower the content of the additive in the glass preform, the better.

For this reason, it is proposed to increase the refractive index difference between the core and cladding by the addition of an additive which lowers the refractive index of glass in the cladding. Examples of such additives are $B_2O_3$ and fluorine and their combination. $B_2O_3$, however, has disadvantages in that it increases the coefficient of thermal expansion of the silica glass and in that it has an absorption loss in a longer wavelength region. Thus, fluorine is preferably used as the refractive index-lowering additive.

The VAD method or the OVPO method in which a porous soot preform is produced by flame hydrolysis of glass raw materials is known as an economical and highly productive method for producing an optical fiber. It is, however, very difficult to add fluorine in a sufficient amount to lower the refractive index of the cladding by such a method utilizing flame hydrolysis. For example, Japanese patent publication No. 15682/1980 discloses a method for adding fluorine to a glass preform, by which the refractive index is lowered by only 0.2 to 0.3%. This means that the amount of fluorine to be added has a limit in this method.

Japanese patent Kokai publication (unexamined) No. 67533/1980 discloses a method for effectively adding fluorine to the glass preform by heating a deposit of fine glass particles in an atmosphere containing a fluorine-containing compound. It is, however, difficult to use this method to adequately distribute fluorine in the glass preform and thus to achieve, by the sole use of fluorine, the refractive index distribution shown in FIG. 1, which is essential to produce a practically operative optical fiber.

A method schematically illustrated in FIG. 2 is proposed as a productive method for producing an optical fiber containing fluorine and having a practically operative refractive index distribution by utilizing formation of the fine glass particle deposit by flame hydrolysis.

In FIG. 2, while rotating and gradually lifting up a glass rod 2 which constitutes the core and attached to a lift-up device 1, fine glass particles which are produced by means of a burner 3 are deposited on the surface of the glass rod 2 to form a porous glass layer 4 corresponding to the cladding. The fine glass particles are produced by supplying the burner 3 with hydrogen, oxygen and glass raw materials such as $SiCl_4$ simultaneously and flame hydrolyzing them. In FIG. 2, numerals 5 and 6 represent a reactor and an outlet, respectively. The thus formed composite of the glass rod and the porous glass layer is heated in an atmosphere containing fluorine in order to add fluorine to the porous glass layer and simultaneously to make the glass layer transparent in order to form a transparent glass preform having a refractive index distribution shown in FIG. 1. If the thickness of the cladding is not sufficient at this stage, the transparent glass preform is drawn and the fine glass particles are again deposited on the surface of the drawn glass preform and heated in an atmosphere containing fluorine. This procedure may be repeated to obtain the cladding having a desired thickness.

In the above-described method utilizing the apparatus of FIG. 2, the glass rod which constitutes the core is often produced by heating and drawing the rod to a desired diameter in an atmosphere containing water vapor. This may result in contamination of the glass rod surface with hydroxyl groups. Particularly, when the glass rod is drawn in a flame formed by burning combustion gas containing hydrogen, the glass rod surface is severely contaminated with the hydrogen groups. In addition, during the formation of the porous glass layer corresponding to the cladding, the glass rod surface tends to be contaminated with the hydroxyl groups derived from water vapor generated in the flame for synthesizing the fine glass particles.

When the transparent glass preform, having the surface of the core contaminated with the hydroxyl groups, is drawn to form an optical fiber, light propagated through the optical fiber suffers from absorption loss due to the hydroxyl groups and hence, the light transmission characteristics of the optical fiber are deteriorated. When the optical fiber is used as a single mode optical fiber, the light transmission is particularly affected by the presence of an interface layer contaminated with the hydroxyl groups between the core and cladding, and the transmission characteristics are remarkably deteriorated since power distribution in the single mode optical fiber reaches the cladding.

For example, a pure quartz rod with very low hydroxyl group content (up to about 10 ppb) is drawn to a diameter of 12 mm in an oxyhydrogen flame. Thereafer, by means of the apparatus of FIG. 2, on the surface of the drawn quartz rod, a porous glass layer of pure silica glass is formed. The outer diameter of the glass layer is 110 mm. The thus produced composite of the quartz rod and the porous glass layer is heated in an atmosphere containing fluorine to obtain a transparent glass preform of 45 mm in outer diameter having a refractive index distribution as shown in FIG. 3.

Then, the glass preform is drawn in the oxyhydrogen flame to a diameter of 12 mm, on which a porous glass layer is again formed by means of the apparatus of FIG. 2. The outer diameter of the glass layer is 110 mm. The thus produced composite is heated in an atmosphere containing fluorine to obtain a transparent glass preform having a refractive index distribution as shown in FIG. 4.

The glass preform is drawn to a predetermined diameter, inserted in and integrated with a commercially available quartz tube, and then drawn to form an optical fiber, resulting in single mode operation at a wavelength of 1.3 micrometer. Its attenuation of light transmission at a wavelength of 1.3 micrometer is 4.0 dB/km and that at wavelengths of 1.39 micrometer due to the presence of the hydroxyl groups is 150 dB/km. These results mean that the hydroxyl groups are formed in the drawing step in the oxyhydrogen flame.

SUMMARY OF THE INVENTION

One object of the present invention is to provide a new method for producing a glass preform for an optical fiber comprising a core made of a pure quartz and a cladding made of quartz glass containing fluorine.

Another object of the present invention is to provide a glass preform for an optical fiber, particularly for a single mode optical fiber which does not suffer from contamination with the hydroxyl groups and has improved light transmission characteristics.

Accordingly, the present invention provides a method for producing a glass preform for an optical fiber comprising a core and a cladding containing fluorine, which method comprises forming a porous glass layer of substantially pure quartz on an outer surface of a starting member consisting of a fused glass rod consisting of a central portion of substantially pure quartz and a peripheral portion of quartz glass containing fluorine, and heating a composite of the fused glass rod and the porous glass layer in an atmosphere containing fluorine to add fluorine to the porous glass layer and to make it transparent.

DETAILED DESCRIPTION OF THE INVENTION

Figure 1:
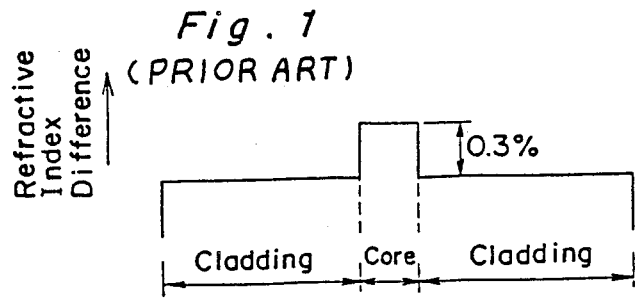
FIG. 1 shows a refractive index distribution of a typical single mode optical fiber, FIG. 2 schematically shows one example of an apparatus for synthesizing a porous glass layer on a glass rod.

As described in connection with the conventional methods, when the fine glass particle deposit is heated in an atmosphere containing fluorine, fluorine tends to be homogeneously added throughout the layer so that it is difficult to achieve the refractive index distribution of FIG. 1.

On the contrary, when the fine glass particle deposit is heated and shrunk to some extent in an atmosphere not containing fluorine and then it is heated in an atmosphere containing fluorine to make it transparent, fluorine is added only to the peripheral portion of the the porous glass layer but not to the central portion of it since the porous glass layer is partially shrunk. The heating step in the atmosphere not containing fluorine may be carried out at a temperature of 1,200° to 1,450° C., and the heating step in the atmosphere containing fluorine may be carried out at a temperature of 1,400° to 1,700° C. The heating atmosphere comprises an inert gas (e.g. helium) and optionally a chlorine compound (e.g. $Cl_2$). Specific examples of the fluorine-containing compound to be contained in the heating atmosphere are $SF_6$, $C_2F_6$, $CCl_2F_2$, $CF_4$ and the like.

When the thickness of the cladding layer is not sufficient at this stage, it is necessary to deposit a further layer of quartz glass containing fluorine. To this end, the transparent glass preform produced in the previous step is heated and drawn, and on its surface, fine glass particles are deposited by means of the apparatus of FIG. 2. The formed composite of the transparent glass rod and the porous glass layer is then heated in the atmosphere containing fluorine to add fluorine to the porous glass layer and to make it transparent. In this heating step, the conditions are substantially the same as in the previous heating step in the atmosphere containing fluorine.

The method according to the present invention can reduce the influence of the hydroxyl groups which may be formed in the drawing step of the glass rod. The reason for this may be explained as follows:

(1) The interfacial portion between the core and the cladding is not contaminated with the hydroxyl groups but a part to the exterior of the interfacial portion is contaminated so that the quantity of light absorbed by the hydroxyl groups is decreased.

(2) If fluorine is not contained in the heating atmosphere, water penetrates into silica glass and forms the hydroxyl group together with the glass structure according to the following reaction equation:

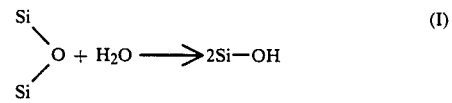
(I)

On the contrary, when fluorine is contained in the heating atmosphere, the formation of the hydroxyl groups may be suppressed by the following equation, even if water penetrates into silica glass:

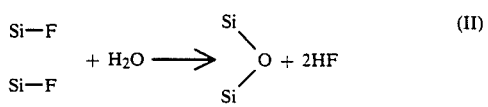
(II)

(3) The hydroxyl group is thought to be formed so as to occupy the oxygen deficient part in glass. Since, however, the oxygen deficient part is occupied by fluorine present in the atmosphere, the hydroxyl group is less readily incorporated in the glass structure.

PREFERRED EMBODIMENTS OF THE INVENTION

The present invention will be hereinafter explained further in detail by following Examples.

EXAMPLE 1

A porous soot preform of pure silica with an outer diameter of 100 mm and a length of 600 mm was produced by the VAD method by supplying oxygen at 35 l/min., hydrogen at 30 l/min., $SiCl_4$ at 1 l/min. and argon 12 l/min. from a multi-tube burner and pulling up the formed preform at a rate of 70 mm/hr. The thus formed porous preform was inserted in a furnace kept at 1,200° C. for 90 minutes. In the furnace, as atmospheric gases, helium and chlorine were introduced at rates of 5 l/min. and 100 ml/min., respectively to sufficiently reduce the amount of hydroxyl groups.

The thus heated porous soot preform was inserted in a furnace kept at 1,400° C. for 30 minutes to shrink it. In the furnace, only helium was introduced at a rate of 5 l/min.

Figure 5:
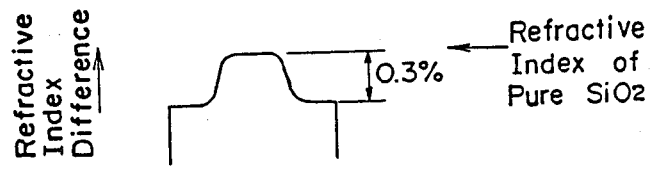
FIGS. 5 to 7 show refractive index distributions in a radial direction of transparent glass preform produced in Examples 1 and 2.

Thereafter, the shrunk preform was inserted in a furnace kept at 1,640° C. to make it transparent. In the furnace, helium and $SF_6$ were introduced at rates of 5 l/min. and 100 ml/min., respectively. A refractive index distribution of the thus produced transparent glass preform is shown in FIG. 5.

Figure 2:
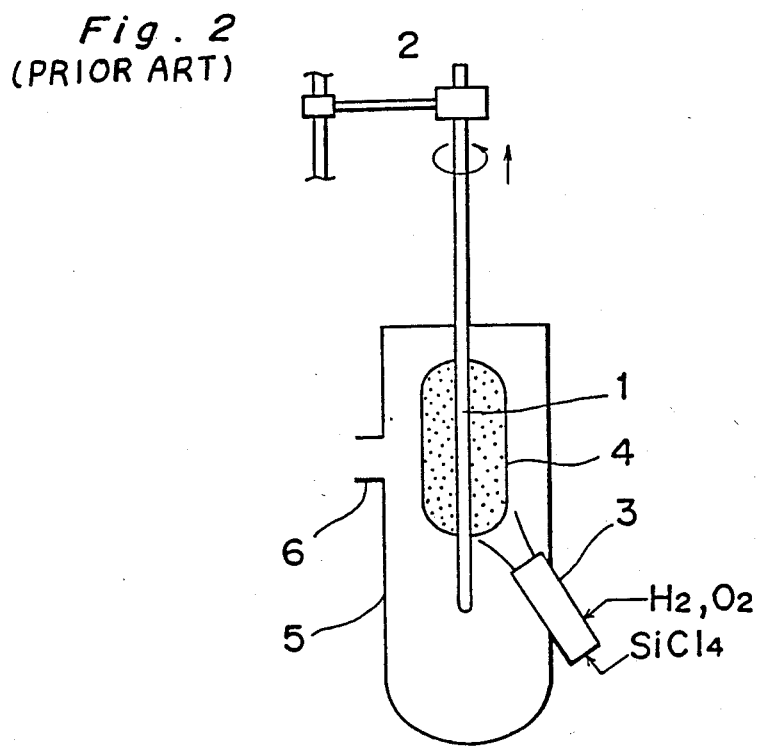
Figure 3:
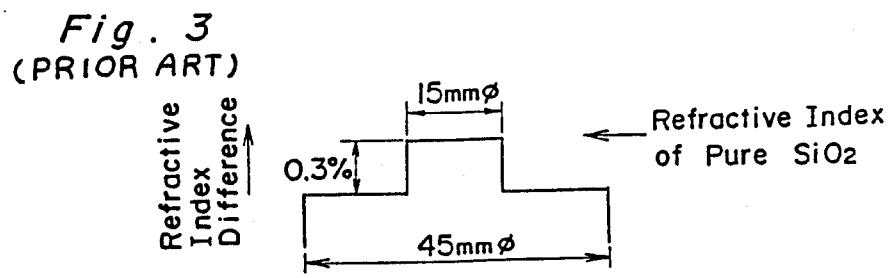
FIGS. 3 and 4 show refractive index distributions of conventional transparent glass preforms.
Figure 4:
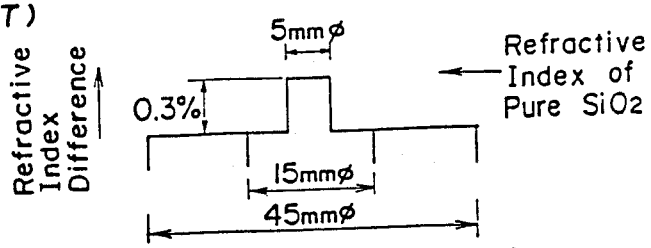

After drawing the transparent glass preform to a diameter of 12 mm in an oxyhydrogen flame generated by a multi-tube burner, a porous glass layer of pure silica was formed on the outer surface of the drawn preform under the following conditions by means of the apparatus of FIG. 2. The outer diameter of the porous glass layer was 110 mm.

| Conditions: | |
| --- | --- |
| Oxygen: | 35 l/min. |
| Hydrogen: | 35 l/min. |
| $SiCl_4$: | 1.1 l/min. |
| Argon: | 12 l/min. |
| Pulling up rate: | 65 mm/hr. |

Figure 6:
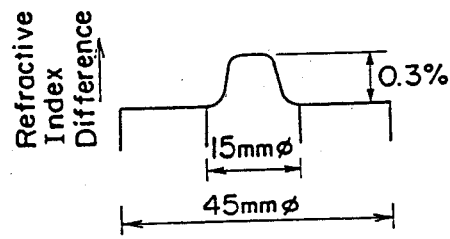

The composite of the transparent glass preform and the porous glass layer was dehydrated in an atmosphere containing fluorine at 1,200° C. and then made transparent at 1,640° C. In the dehydration step, helium, chlorine and $SF_6$ were introduced at rates of 5 l/min., 50 ml/min. and 100 ml/min., respectively, and in the transparent step, helium and $SF_6$ were introduced at rates of 5 l/min. and 100 ml/min., respectively. The thus produced transparent glass preform had an outer diameter of 45 mm and refractive index distribution shown in FIG. 6.

Figure 7:
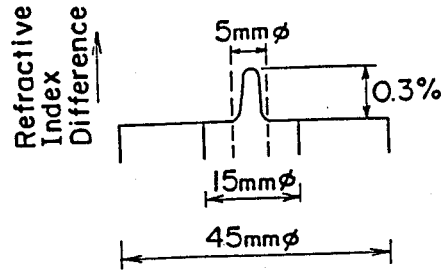

The glass preform was again drawn to a diameter of 12 mm in the oxyhydrogen flame and then on its outer surface, a porous glass layer of pure silica was formed under the same conditions as above by means of the apparatus of FIG. 2. The outer diameter of the porous glass layer was 110 mm. The composite of the transparent glass preform and the porous glass layer was dehydrated and made transparent under the same conditions as above to obtain a transparent glass preform having an outer diameter of 45 mm and refractive index distribution as shown in FIG. 7.

The finally produced transparent glass preform was drawn to a desired diameter, inserted in and integrated with a commercially available quartz tube and then spun to form an optical fiber of 125 micrometer in diameter. Its attenuation of light transmission at a wavelength of 1.3 micrometer was 1.0 dB/km and that at a wavelength of 1.39 micrometer due to the presence of the hydroxyl groups was 10 dB/km.

EXAMPLE 2

In the same manner as in EXAMPLE 1 but using a plasma flame in place of the oxyhydrogen flame for drawing the glass preform, a transparent glass preform was produced. The finally produced glass preform had a refractive index distribution as shown in FIG. 7.

The glass preform was spun in the same manner as in EXAMPLE 1 to form an optical fiber. Its attenuation of light transmission at a wavelength of 1.3 micrometer was 0.6 dB/km and that at a wavelength of 1.39 micrometer due to the presence of the hydroxyl groups was 6 dB/km.

The glass preform may be drawn in an electric resistance heater or an induction heater.

What is claimed is:

1. A method for producing a glass preform for a single mode optical fiber having a cladding containing fluorine, and a core, comprising the steps of:

heating and partially fusing a porous glass rod of pure quartz to such extent that said porous glass rod is not made transparent;

heating said partially fused glass rod in an atmosphere containing fluorine to provide the addition of fluorine only to the outer portion of said porous glass rod so that the inner portion of said porous glass rod remains free of fluorine as pure quartz and to result in said porous rod becoming a substantially transparent fused glass rod;

drawing said fused glass rod, having an inner portion free of fluorine, to a certain diameter;

forming a porous glass layer of pure quartz surrounding the outer surface of said fused glass rod; and heating said fused glass rod and said porous glass layer in an atmosphere containing fluorine to provide the addition of fluorine to said porous glass layer in an amount equal to the amount of fluorine added to said outer portion of said porous glass rod, and to result in said porous glass layer becoming substantially transparent, whereby a step index optical fiber preform is provided having a uniform amount of fluorine throughout its cladding and having a core free of fluorine.

2. A method according to claim 1, wherein the drawing of said glass rod is performed in a plasma flame.

* * * * *